United States Patent [19]

Machado

[11] Patent Number: 5,219,954

[45] Date of Patent: * Jun. 15, 1993

[54] MISCIBLE POLYKETONE PHENOLIC NOVOLAC BLENDS

[75] Inventor: Joseph M. Machado, Richmond, Tex.

[73] Assignee: Shell Oil Company, Houston, Tex.

[*] Notice: The portion of the term of this patent subsequent to Nov. 24, 2009 has been disclaimed.

[21] Appl. No.: 752,385

[22] Filed: Aug. 30, 1991

[51] Int. Cl.$^5$ .................. C08L 61/06; C08L 61/10; C08G 8/10
[52] U.S. Cl. .................... 525/502; 525/539
[58] Field of Search ............. 525/502, 539; 528/392

[56] References Cited

U.S. PATENT DOCUMENTS

| | | | |
|---|---|---|---|
| H732 | 2/1990 | Lutz | 525/471 |
| 4,070,532 | 1/1978 | Hammer | 525/451 |
| 4,812,522 | 3/1989 | Handlin | 525/153 |
| 4,843,144 | 6/1989 | Van Broekhoven et al. | 528/392 |
| 4,880,865 | 11/1989 | George | 524/449 |
| 5,166,266 | 11/1992 | Machado et al. | 525/502 |

OTHER PUBLICATIONS

Modern Plastics Encyclopedia, 1988 pp. 114–116.
Textbook of Polymer Science (3ed) by Fred W. Billmeyer, Jr. pp. 436–440.

*Primary Examiner*—James J. Seidleck
*Assistant Examiner*—W. R. H. Clark
*Attorney, Agent, or Firm*—James O. Okorafor

[57] ABSTRACT

A miscible polymer blend comprising polyketone and phenolic-based novolac polymers is provided. These blends have as a primary advantage a Tg which can be manipulated so as to produce desirable properties. A process for producing these blends and articles of manufacture produced therefrom are also disclosed.

17 Claims, No Drawings

MISCIBLE POLYKETONE PHENOLIC NOVOLAC BLENDS

FIELD OF THE INVENTION

This invention generally relates to polyketone blends. More particularly, this invention relates to a miscible blend of polyketone and phenolic-based novolac polymers.

BACKGROUND OF THE INVENTION

Polymers of carbon monoxide and olefins generally referred to as polyketones are well known in the art.

Within this general class of polyketone polymers, this invention is particularly concerned with the sub-class comprising linear alternating polymers of carbon monoxide and at least one ethylenically unsaturated hydrocarbon. This type of polyketone polymer is disclosed in for example, U.S. Pat. No. 4,880,865, which is herein incorporated by reference.

Phenolic resins are very well known in the art. These are thermoset resins which are used in high-temperature electrical applications such as ovens and toasters, and as engineering materials.

Blends of polyketone with other polymeric materials such as polyamide (nylon), polycarbonate, polyester, polyacetal, and polyvinyl phenol are known in the art. Generally, these blends are immiscible thereby restricting manipulation of certain blend properties.

Immiscible, though compatible, blends are the most common commercially available polymer mixture. However, on rare occasions, polymer pairs will form miscible blends. The term miscible will be used herein to describe a mixture of two or more polymers that form a single-phase solution (solid or liquid) on a molecular scale within the amorphous phase. When one or both of the polymer blend components is capable of forming both a crystalline and an amorphous phase, then the term miscible refers only to the amorphous phase in which the separate components are capable of mixing on the molecular level. Miscibility can be achieved by selecting components that interact with one another in an attractive mode (e.g. which mix exothermically).

Several methods can be used to determine miscibility in polymer blends. For example, when a film is prepared from a miscible blend, it is usually optically clear, while immiscible blend films are usually opaque. However, this criterion is not useful when one of the blend components is crystallizable. The most commonly used criterion for miscibility is the existence of a single glass transition temperature for a given miscible blend. This parameter is relatively easy to measure for amorphous systems, and rapid if a technique such as differential scanning calorimetry is used. Greater sensitivity, especially useful for semi-crystalline blends, can be obtained when dynamic mechanical methods are employed to measure the glass transition temperature. As the relative proportion of components changes, a smooth change between the glass transition temperatures for the pure blend components and the glass transition temperatures for the various blends will be observed over the miscible range for the blends.

In certain cases, it would be desirable to produce a miscible polyketone blend. Such a blend permits the manipulation of glass transition temperature (Tg) and other dependent properties. Because most polymer blends are immiscible, the goal of producing a miscible polyketone blend is recognized to be difficult to achieve. Nevertheless, the need for such a blend continues to exist.

SUMMARY OF THE INVENTION

It is an object of the invention to provide a miscible polyketone blend.

It is also an object of the invention to provide a miscible blend of polyketone and phenolic resins.

It is a particular object of the invention to provide a miscible blend of polyketone and phenolic based novolac polymers.

Accordingly, it now provided, a miscible polymer blend comprising a linear alternating polymer of carbon monoxide and at least one ethylenically unsaturated hydrocarbon and a phenolic-based novolac polymer wherein the phenol group can be substituted with an alkyl group of not more than eight carbon atoms.

DETAILED DESCRIPTION OF THE INVENTION

Mixtures of disimilar polymers generally tend to exhibit extremely limited mutual solubility. This characteristic tends to limit the commercial utility of many polymer blends. Many desirable properties may be obtained with immiscible blends, if suitable steps are taken to "compatibilize" the blend. However, certain properties are not obtainable with immiscible blends. An important property of a polymeric material is its glass transition temperature (Tg) because many properties change considerably in the vicinity of this temperature as a result of the onset of molecular motion. Copolymerization, plasticization, and miscible blending are three known methods of manipulating Tg.

Exceptions to the rule of immiscibility among polymer blends certainly exist. It is extremely well known that polystyrene and poly(2,6 dimethyl phenylene oxide) are miscible. It is also known that polyketone/poly(vinyl phenol), hereinafter sometimes simply referred to as PVP, form miscible blends. See U.S. Pat. No. 4,812,522.

Nevertheless, the requirements necessary to achieve miscibility for a given polymer blend have been described as Draconian. That is, polymer blend miscibility applies to very specific polymer pairs prepared under a given set of conditions. Subtle changes in the structure of either polymer or in the conditions of blending can lead to immiscibility.

Polyvinyl phenol bears a superficial structural resemblance to a phenolic novolac. However, the structural differences raises doubt as to whether miscibility with polyketone would occur in the latter materials. In PVP, the phenol group is bonded in the para position to the polymer backbone and is therefore highly available for hydrogen bonding. In novolacs, the phenol group is usually bonded at both ortho-positions and is part of the polymer backbone. As a result, it is significantly less accessible for hydrogen bonding. Because miscibility is believed to be driven by favorable hydrogen bonding with polyketone, the observation of miscibility in the case of novolacs was (is) rather surprising.

Generally speaking, the materials needed to successfully practice this invention are polyketones of the linear alternating monomers type previously described and phenolic-based novolac polymers. Still generally speaking, the practice of this invention involves the admixing of suitable quantities of these materials under conditions that result in the formation of a molecularly miscible blend.

Molecularly miscible blends are herein defined as blends which can be mixed such that they exhibit only one glass transition temperature, indicating a single amorphous phase. More specifically, molecularly miscible blends exhibit one glass transition temperature as measured by thermal analysis using a differential scanning calorimeter.

The useful materials and the practice of this invention is further disclosed in more details in subsequent portions of this specification.

The Polymer

The polyketone polymers of the invention are of a linear alternating structure and contain substantially one molecule of carbon monoxide for each molecule of unsaturated hydrocarbon. Hereinafter, these polymers may sometimes be simply referred to as polyketones. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

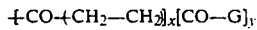

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO+CH₂CH₂+units and the —CO+G+ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

Phenolic-Based Novolac Polymers

These are generally referred to as two-step phenolics and are produced when a less-than-stochiometric amount of formaldehyde is reacted with phenol in an acidic solution to form a solid product that cannot react to completion without additional formaldehyde. The novolacs so formed are thermoplastic polyphenols. Thermoset characteristics can be imparted to these thermoplastic phenols by the addition of hexamethylenetramine (hexa), a catalyst containing formaldehyde. Additional information on phenolic-based novolac polymers, can be obtained from the following references: Textbook of Polymer Science (3ed) by Fred W. Billmeyer, Jr., Pages 436–440; and Modern Plastic Encyclopedia, 1988 (ed) Pages 114–116. The relevant portions of these references are herein incorporated by reference.

The novolac polymers useful herein can be approximately represented by the general formula:

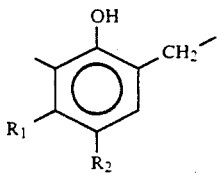

wherein $R_1$ is H, OH, or any alkyl group containing 8 carbon atoms or less and $R_2$ is H, or any alkyl group containing 8 carbon atoms or less.

These novolac polymers are exemplified by phenol-formaldehyde, cresol formaldehyde, resorcinol-formaldehyde, p-butyl phenol-formaldehyde, p-ethyl-phenol-formaldehyde, p-hexyl phenol-formaldehyde, p-propyl phenol-formaldehyde, p-pentyl-phenol-formaldehyde, p-octyl-phenol-formaldehyde, p-heptyl phenol-formaldehyde and p-nonyl-phenol-formaldehyde. These various novolac polymers differ in their $R_1$ and $R_2$ substituents, melting points, viscties, and other properties. A commercial source for obtaining these compounds is Schenectady Chemicals Company.

Table A further details the various novolacs and their properties.

TABLE A

| Novolac Polymers Used | | | | |
|---|---|---|---|---|
| Designation | | Description | $R_1$ | $R_2$ |
| HRJ 2190 | (A) | Phenol-Formaldehyde Novolac Viscosity[1], 4000 cp M.P. 110° C.[2] | —H | —H |
| HRJ 1166 | (B) | Phenol-Formaldehyde Novolac Viscosity[1], 1100 cp M.P. 84° C.[2] | —H | —H |
| SRF 1501 | (C) | Resorcinol-Formaldehyde M.P. 105° C. | —OH | —H |
| HRJ 2901 | (D) | Cresol-Formaldehyde melting point 190° C. | —CH$_3$ | H |
| HRJ-2355 | (E) | p-butyl Phenol-Formaldehyde melting point 116° C. | —H | —(CH$_2$)$_3$—CH$_3$ |
| SP-1090 | (F) | p-nonyl Phenol-Formaldehyde melting point 93° C. | —H | —(CH$_2$)$_8$—CH$_3$ |

[1]Viscosity of Novolacs cone and plate as determined by ASTM D-4287-83
[2]Melting point of Novolacs were determined by ASTM E-2867

Conventional Additives

These additives generally include plasticizers, antioxidants, mold release agents and pigments. These additives can be added by conventional methods prior to, together with or subsequent to admixing the polymer and the mineral filler(s).

The following illustrative examples and tables further detail the various aspects of this invention.

EXAMPLE 1

Preparation of Polyketone Polymer

A terpolymer of carbon monoxide, ethylene and propylene was produced in the presence of a catalyst composition formed from palladium acetate, trifluoroacetic acid and 1,3-bis[di(2-methoxyphenyl)-phosphino]propane.

The terpolymer had a melting point of 220° C. and an LVN, measured in m-cresol at 60° C., of 1.8 dl/g.

EXAMPLE 2

Preparation of Polyketone Phenolic Novolac Blends

Prior to compounding, polyketone pellets and novolac flake were dried separately under vacuum at 50° C. for 16 hours. Blends were prepared by combining the desired ratio of polyketone pellets and novolac flake and tumble blended for several minutes. The mixture was then added to a 30 mm Haake co-rotating twin screw extruder operating at 250° C. and 200 RPM. The extrudate strand was passed through a water bath and through a pelletizer. The pellets were dried and fed into an Arburg Allrounder injection molding machine operating at a melt temperature of 250° C. Molded ASTM specimens were stored over dessicant prior testing. Differential scanning calorimetry and dynamic mechanical analysis were performed on molded specimens. The results are shown in Table 1.

TABLE 1

Differential Scanning Calorimetry and dynamic mechanical results for polyketone/phenolic novolac blends

| 1 | 2 | 3 | 4 | 5 | 6 |
|---|---|---|---|---|---|
| Composition (PK/NOV w/w) | Tm (°C.) | Hm (J/g) | Xstal(PK) (%) | Tg-DSC (°C.) | Tg-tanδ (°C.) |
| 100/0 (Control) | 219.0 | 83.7 | 36.8 | 17 | 18 |
| 98/2 | 219.5 | 85.4 | 38.3 | 18 | 22 |
| 90/10 | 217.4 | 78.1 | 38.2 | 30 | 40 |
| 80/20 | 213.6 | 73.0 | 40.9 | 37 | 41 |
| 70/30 | 208.0 | 59.8 | 37.6 | 49 | 50 |
| 50/50 | 195.4 | 33.8 | 29.7 | 48 | 53 |
| 30/70 | — | — | — | 61 | 59 |
| 0/100 | — | — | — | 74 | — |

Table 1 shows the thermal properties of polyketone/novolac blends containing various amount of a phenolic-based novolac (HRJ-2190). Column 2 shows that as novolac is added to the blend, the melting point of the polyketone component decreases in a continuous manner. This is evidence of miscibility in the melt and in the amorphous phase of the blend upon solidification. The magnitude of the melting point depression is proportional to the strength of the interaction which drives miscibility. In the present case, the depression is relatively large, indicating that the interaction is strong.

Column 3 shows the measured enthalpy of melting which is proportional to the total crystallinity of the blend. This decreases as novolac is added, which is expected since the novolac cannot crystallize. It is significant that no melting, and therefore no crystallinity, was detected for the blend containing 30% polyketone. Suppression of polyketone crystallization in the novolac-rich regime is further evidence of miscibility in the melt. In column 4, the data in column 3 is normalized with respect to the content of polyketone and the known heat of fusion of polyketone crystals to give the degree of crystallinity of the polyketone component. It is important to note that the degree of crystallinity developed by the polyketone component is fully maintained in the polyketone-rich regime. A substantial degree of crystallinity is maintained up to 50% novolac in the blend. This allows the blends to maintain good strength and stiffness in the polyketone-rich (thermoplastic) blend regime. Crystallinity is crucial to maintaining polyketone's desirable property set.

Column 5 provides the most compelling evidence for miscibility. This shows that the glass transition temperature, measured by DSC, increases in proportion to the novolac content of the blend. This is the primary attribute of a miscible polymer blend. Manipulation of the glass transition temperature also effect important property changes. A higher Tg produces a stiffer, usually stronger, material with better resistance to creep and less thermal expansion and mold shrinkage. Column 6 verifies the results in Column 5. This gives the Tg measured by dynamic mechanical analysis performed in oscillatory torsion at a frequency of 1 rad/sec. The glass transition temperature corresponds to the peak of the loss tangent-versus-temperature curve. Column 6 shows that Tg increases continuously as novolac is added to the blend.

EXAMPLE 3

Preparation of Polyketone-Substituted Novolac Blends

Blends of the polyketone of Example 1 and a series of novolacs derived from substituted phenols, which are described in Table A, were prepared according to the procedure outlined in Example 2. Each of these novolacs were blended with polyketone at a concentration of 20 wt %. The thermal properties of the resultant blends are given in Table 2. The mechanical properties of these blends are given in Table 3. Table 4 shows the mechanical properties of blends made with phenol formaldehyde (HRJ 2190).

TABLE 2

Differential scanning calorimetry and dynamic mechanical results for blends between polyketone and substituted novolacs.

| 1 Composition (PK/NOV) (w/w %) | | 2 Novolac Type | 3 Tm (°C.) | 4 X-stal (%) | 5 Tg(DSC) (°C.) | 6 Tg(tan δ) (°C.) |
|---|---|---|---|---|---|---|
| 100/0 | Control | — | 219.0 | 36.8 | 17 | 18 |
| 80/20 | (A)* | Phenol HRJ 2190 | 213.6 | 40.9 | 37 | 41 |
| 80/20 | (B) | Phenol HRJ-1166 | 213.3 | 41.2 | 30 | 32 |
| 80/20 | (C) | Resorcinol SRF-1501 | 216.7 | 41.6 | 44 | 36 |
| 80/20 | (D) | m-Cresol HRJ-2901 | 210.0 | 39.5 | 44 | 57 |
| 80/20 | (E) | p-butyl HRJ-2355 | 219.0 | 38.0 | — | 46 |
| 80/20 | (F) | p-nonyl SP-1090 | 220.0 | 40 | — | 22 and 56 |

*Alphabetical designations of novolacs in Table 2 correspond to those of Table A.

The data shows that polyketone blends containing novolacs which were derived from phenol, cresol, and resorcinol exhibit higher Tg's and suppressed Tm's in comparison to the neat polyketone (control). This indicates miscibility and a high degree of interaction. For a butyl phenol based novolac blend, an increased Tg is observed indicating miscibility, but no melting point depression, indicating that the interaction is weak. For a nonyl phenol based novolac blend, two separate Tg's are observed and no melting point depression occurs indicating immiscibility and no notable interaction for this blend. Thus, the driving force for miscibility with polyketone is weakened as the size of the alkyl substituent on a substituted novolac increases.

TABLE 3

Mechanical Properties of Polyketone and Substituted-Novolac Blends.

| 1 Composition (PK/NOV) | 2 Novolac | 3 Flex Mod[1] (kpsi) | 4 Flex Str.[1] (psi) | 5 T.S.[2] (psi) | 6 Elong.[2] (%) | 7 N. Izod[3] (ft-lb/in) | 8 Gardner* (in-lb) |
|---|---|---|---|---|---|---|---|
| 100/0 | — | 251 | 8690 | 8590 | 112 | 4.1 | 64 |
| 80/20 A | HRJ 2190 phenol | 371 | 11,910 | 8380 | 112 | 0.54 | 5 |
| 80/20 B | HRJ 1166 phenol | 210 | 7840 | 7370 | 425 | 0.65 | 8 |
| 80/20 C | SRF 1501 resorcinol | 219 | 8180 | 7370 | 204 | 0.67 | 7 |
| 80/20 D | HRJ 2901 m-cresol | 561 | 16,240 | 9580 | 35 | 0.63 | 6 |

*Gardner impact measured at −30 C. according to ASTM D3029.
[1][2][3]were measured according to ASTM D760, D638, and D256 respectively.

Table 3 lists the properties of polyketone blends containing 20 wt % of substituted novolac materials. The higher molecular weight phenolic (HRJ 2190) exhibited improved flexural stiffness and strength relative to the polyketone control. The lower molecular weight phenolic novolac (HRJ 1166) provided no substantial beneficial effect on properties except that the blend exhibited excellent ductility as measured by elongation to break. The m-cresol-based novolac provided a 100% improvement in both flexural modulus and flexural strength and a modest (10%) improvement in tensile strength relative to the properties of the unblended polyketone. This blend also possessed the highest glass transition temperature among the variety of novolacs which were tested. The resorcinol-based blend did not exhibit significant property improvements. This may be related to high water absorption because the resorcinol based novolac is a water soluble material.

EXAMPLE 4

Properties of polyketone/phenol-formaldehyde novolac blends

TABLE 4

| 1 Composition (PK/NOV) | 2 novo-lac | 3 Flex Mod (kpsi) | 4 Flex Str. (psi) | 5 T.S. (psi) | 6 Elong (%) | 7 N. Izod (ft-lb/in) | 8 Gardner (in-lb) |
|---|---|---|---|---|---|---|---|
| 100/0 (Control) | — | 251 | 8690 | 8590 | 112 | 4.1 | 64 |
| 98/2 | HRJ 2190 | 258 | 9180 | 8730 | 329 | 2.6 | 44 |
| 90/10 | HRJ 2190 | 321 | 10.770 | 8200 | 188 | 0.75 | 14 |
| 80/20 | HRJ 2190 | 371 | 11.910 | 8380 | 112 | 0.54 | 5 |
| 70/30 | HRJ 2190 | 613 | 17.380 | 10.540 | 10 | 0.52 | 4 |
| 50/50 | HRJ 2190 | — | — | 8210 | 3 | 0.51 | — |

*Same ASTM tests as in Table 3 were used.

Table 4 shows the mechanical properties of polyketone/phenol-based novolac (HRJ 2190) blends at various compositions. Columns 3 and 4 shows that novolac serves to increase the flexural modulus and flexural strength of polyketone in proportion to its concentration in the blend. The tensile strength shown in Column 5 is not strongly affected, although it is improved substantially in the case of the blend containing 30% novolac. Column 6 shows that a high degree of tensile elongation i.e. ductility is maintained up to 20% added novolac. Notched Izod and Gardner impact strength (Column 7 and 8) are reduced as novolac is added to the blend which must be expected when the glass transition temperature is raised.

While this invention has been described in detail for purposes of illustration, it is not to be construed as limited thereby but is intended to cover all changes and modifications within the spirit and scope thereof.

That which is claimed is:

1. A miscible polymer blend comprising a linear alternating polymer of carbon monoxide and at least one ethylenically unsaturated hydrocarbon and a phenolic-based novolac polymer.

2. A composition as in claim 1 wherein said phenolic-based novolac polymer is phenol-formaldehyde.

3. A composition as in claim 1 wherein said phenolic-based novolac polymer is cresol-formaldehyde.

4. A composition as in claim 1 wherein said phenolic-based novolac polymer is resorcinol-formaldehyde.

5. A composition as in claim 1 wherein said phenolic-based novolac polymer is p-butyl-phenol-formaldehyde.

6. A composition as in claim 1 wherein said phenolic-based novolac polymer is substituted with an alkyl group containing not more than eight (8) carbon atoms.

7. A composition as in claim 6 wherein said novolac is a member of the group consisting of p-ethyl-phenol-formaldehyde, p-propyl-phenol-formaldehyde, p-pentyl-phenol-formaldehyde, p-hexyl-phenol-formaldehyde, p-heptyl-phenol-formaldehyde, p-octyl-phenol-formaldehyde, or mixtures thereof.

8. A composition as in claim 1 wherein said novolac polymer is present in an amount within the range of from about 1 to 30 weight percent.

9. A composition as in claim 1 wherein said novolac polymer is present in an amount within the range of from about 1 to 10 weight percent.

10. A composition as in claim 1 having and exhibiting improved ductility, improved flexural stiffness, modulus, strength, and improved tensile strength.

11. A composition as in claim 10 wherein said novolac polymer is cresol-formaldehyde.

12. A composition as in claim 1 characterized by a single glass transition temperature (Tg) which is higher than that of a pure linear alternating polymer of carbon monoxide and at least one ethylenically unsaturated hydrocarbon.

13. A process of producing a miscible blend of (i) a linear alternating polymer of carbon monoxide and one ethylenically unsaturated hydrocarbon and (ii) a phenolic-based novolac polymer involving suitably admixing (i) and (ii) under conditions that result in the production of a miscible blend.

14. A process as in claim 13 wherein said novolac polymer is present in an amount within range of from about 1 to 30 weight percent.

15. A process as in claim 14 wherein said novolac polymer is present in an amount within the range of from about 1 to 10 weight percent.

16. A process as in claim 15 wherein said novolac polymer is phenol-formaldehyde.

17. A shaped article of manufacture produced from the polymer of claim 1.

* * * * *